United States Patent [19]

Wilck

[11] Patent Number: 4,831,214

[45] Date of Patent: May 16, 1989

[54] HIGH VOLTAGE CABLE JOINT AND METHOD OF MAKING SAME, AND HIGH VOLTAGE CABLE TERMINATION

[75] Inventor: Manfred H. O. Wilck, Neubiberg, Fed. Rep. of Germany

[73] Assignee: Raychem GmbH, Ottobrunn, Fed. Rep. of Germany

[21] Appl. No.: 136,161

[22] Filed: Dec. 18, 1987

[30] Foreign Application Priority Data

Dec. 19, 1986 [GB] United Kingdom ................. 8630335

[51] Int. Cl.$^4$ .................. H02G 15/188; H02G 15/068
[52] U.S. Cl. ..................................... 174/73.1; 156/49
[58] Field of Search ............... 174/73.1, 88 C; 156/49

[56] References Cited

U.S. PATENT DOCUMENTS

| | | | |
|---|---|---|---|
| 3,829,600 | 8/1974 | Portinari et al. | 174/73.1 |
| 4,006,286 | 2/1977 | Larsson | 174/73.1 |
| 4,383,131 | 5/1983 | Clabburn | 174/73.1 |
| 4,390,745 | 6/1983 | Böttcher et al. | 174/73.1 |
| 4,551,915 | 11/1985 | Larsson | 174/73.1 X |

FOREIGN PATENT DOCUMENTS 0244957 11/1987 European Pat. Off. ............ 174/143
2110479 6/1983 United Kingdom ............... 174/143

*Primary Examiner*—Laramie E. Askin
*Attorney, Agent, or Firm*—Edith A. Rice; Herbert G. Burkard

[57] ABSTRACT

A joint between high voltage cables is formed by employing a connector having the same diameter as the cable dielectric. A layer of stress controlling material extends from the cable screen on one side of the joint, along the cable dielectric, across the connector, along the dielectric of the other cable and on to the screen of the other cable. A layer of conducting material extends on top of the stress controlling layer and longitudinally encompasses the conductor connector and overlaps the dielectric of both cables. An insulating layer encloses the conductive layer. Further layers of conductive and-/or stress controlling material may be applied around the joint. In addition to being used in the formation of a joint between high voltage cables, a layer of stress controlling material with a layer of conducting material on its outer surface is employed in forming a termination of a high voltage cable.

16 Claims, 5 Drawing Sheets

HIGH VOLTAGE CABLE JOINT AND METHOD OF MAKING SAME, AND HIGH VOLTAGE CABLE TERMINATION

This invention relates to joints between high voltage electric power cables, and to the termination of a high voltage cable. By high voltage is meant a voltage greater than 1 kV, and the present invention finds particular, though not exclusive, application to cables in the 69 kV and 115 kV voltage ranges.

Joints and terminations of power cables may be made in a variety of ways, each of which involves preparing each cable to be joined or terminated by successively cutting back the layers of the cable, such as the outer protective jacket, earth screen wires, extruded screen, and insulation, to expose the underlying layers including the conductor. For a joint, the conductors are then mechanically and electrically connected together, and insulation and screening layers applied around the connection region to reinsulate the joint and to control the electrical stress at the adjacent ends of the cables. For a termination, a lug or elbow is mounted on the conductor and the cut-back cable end enclosed within insulation as necessary. At voltages above about 12 kV to 15 kV, it becomes important to provide enhanced stress control. This can be provided by geometrical means, such as by the formation of a stress cone, or by the use of material having stress control characteristics. A particularly advantageous technology that has extensively been applied to cable joints and terminations is that involving recoverable, for example heat-shrinkable, polymeric materials. By including suitable fillers into high density polyethylene, for example, insulating, non-tracking, conducting, and semi-conducting stress control characteristics can be obtained. By suitable expansion and cross-linking treatment, recoverability can be imparted to articles made from such materials. For convenience, though not by way of limitation, recoverable, and in particular heat-shrinkable joints will hereinafter be referred to, although the invention is applicable to terminations, and to joints and to terminations formed partially or wholly by other means, such as by taping or by enclosing within curable resin for example.

A recoverable article is an article the dimensional configuration of which may be made to change appreciably when subjected to the appropriate treatment. The article may be heat-recoverable such that the dimensional configuration may be made to change when subjected to a heat treatment. Usually these articles recover, on heating, towards an original shape from which they have previously been deformed but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

The polymeric material may be cross-linked at any stage in its production that will enhance the desired dimensional recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other articles as described, for example, in U.S. Pat. No. 4,035,534, elastomeric member such as an outer tubular member is held in a stretched state by a second member, such as an inner tubular member, which, upon heating weakens and thus allows the elastomeric member to recover.

U.S. Pat. Nos. 4,383,131 and 4,390,745 disclose joint configurations that are particularly useful at high voltage, and especially in the 12 kV to 36 kV voltage ranges. U.S. Pat. No. 4,390,745 for example, discloses a configuration in which a recoverable tubular sleeve of an enclosure for a cable joint comprises an outer layer of insulating material and an inner co-extruded layer of stress grading material with conducting layers axially spaced apart on the inner surface of the stress grading layer. The stress grading layer is arranged to extend from the screen of one cable, across the connector, and on to the screen of the other cable, and the conducting layers are arranged so as respectively to enclose the connector region and to overlap the exposed ends of the screens of each of the jointed cables. At higher voltages, however, it has been found that electrical discharge problems can be encountered with joints of such configuration, and these are believed to be associated with the step at the ends of the conductive layers in such a location of high electric field.

U.S. Pat. No. 4,551,915 relates to a method of controlling electrical stress due to a discontinuity in a region of high electric field strength in which stress control material is applied over the region of high field strength and a conductive layer is placed on the outer surface of the stress control material. The disclosure of the document is mainly concerned with the termination of a cable, and shows stress control material extending over exposed cable insulation and over the cut-back of the cable screen at the end of a screened cable, with conductive material extending on top of the stress control material around the screen cut-back. The invention is said to be applicable also, inter alia, to a cable joint.

It is one object of the present invention to provide a high voltage cable joint and termination, an enclosure for a high voltage cable joint and termination, and a method of assembly of a high voltage cable joint and termination, which overcome the above-mentioned disadvantage.

It is a further object of the present invention to provide a high voltage cable joint and termination, enclosure therefor, and method of assembly thereof, that allows the joint and termination to be formed in a particularly convenient manner.

In accordance with one aspect of the present invention, there is provided an elongate, generally tubular enclosure for enclosing a joint between high voltage cables, the enclosure comprising an inner layer of electrical stress control material that extends in close contact with an outer layer of electrically insulating material, and a layer of electrically conductive material that extends between and in close contact with both said inner and outer layers along part only of the lengths thereof so as, in use, to overlap the insulation of each of the cables joined together and to extend continuously therebetween.

By "close contact" is meant that substantially no voids that would give rise to electrical discharges are present between layers so disposed.

With the enclosure of the invention, therefore not only can the stress control layer be arranged to extend from the screen of one cable, over the connector, and on to the screen of the other cable, but also the further stress control provided by the conductive layer can be achieved whilst reducing the risk of inducing electrical discharges due to the fact that the conductive layer is located in a region of lower stress, being separated from the very high stress region by the stress control layer.

The conductive layer of the enclosure around a cable joint can be positioned so as to provide a Faraday Cage around the connector of the conductors of the two cables. It has been found that locating such layer on the outside, rather than the inside, of the semi-conductive layer enhances the performance of the joint. This arises from the fact that should any voids occur in the high electrical stress region at the ends of the conductive layer, resulting in electrical discharges, such discharges are significantly less damaging since they occur on the surface of the semiconducting material and not on the surface of the more vulnerable cable dielectric (which would be the case if the conductive layer were conventionally located so as to extend over the connector region directly on to the dielectric of each of the cables). Furthermore, more control of the longitudinal positioning of the conductive layer can be obtained if it is mounted on the outside rather than the inside of a tubular layer.

Advantageously, the enclosure comprises at least one further electrically conductive layer that is arranged to enclose part only of the length of said outer insulating layer so as, in use, to overlap the connection between the two cables, and/or to overlap the cable insulation between the connection and each of the cable screens, and preferably being axially spaced apart from the connection and screens.

The enclosure may comprise a further outer stress controlling layer that may be provided in addition or alternatively to said at least one further conductive layer. The at least one further conductive layer may be arranged to extend in close contact on the inner or on the outer surface of said further stress controlling layer, when present, or may otherwise be disposed between said outer insulating layer and a further outer insulating layer.

In one preferred embodiment, there is provided an elongate, generally tubular enclosure for enclosing a joint between high voltage cables, the enclosure comprising the following layers that are arranged successively to enclose one another: an innermost layer of electrical stress controlling material, an inner layer of conductive material, at least one intermediate layer of insulating material, an outer layer of conducting material, and an outermost layer of insulating material.

Advantageously, at least one, and preferably more than one, of the layers is recoverable, for example shrinkable by heat.

At least one of the layers of the enclosure of the invention may be extruded, preferably as a tubular article, and two or more of the layers may be co-extruded. In particular, laterally, usually radially, outwardly beyond the inner layer of stress grading material and the conductive layer, the enclosure advantageously comprises a co-extruded tubular article having an inner insulating layer of elastomeric material and an outer insulating layer of recoverable thermoplastic material acting as a hold-out. Such a member may be in accordance with the disclosure of U.S. Pat. No. 4,634,615. A further co-extruded tubular article may enclose the firstmentioned article, and may comprise two recoverable thermoplastic layers, the inner of which is insulating and the outer of which is conductive.

In accordance with another aspect of the present invention, there is provided a joint between two high voltage cables, wherein: the outer jacket of each cable is removed to expose the underlying cable screen, the screen is removed to expose the underlying cable insulation, and the insulation is removed to expose the cable conductor; the conductors of each cable are joined together; an innermost tubular layer of electrical stress controlling material extends over the joined conductors, along the insulation of each cable and overlaps and contacts each of the cable screens; and wherein an inner tubular layer of electrically conductive material extends along the outer surface of the innermost stress control layer so as to enclose the connection between the conductors and to extend partway only along the insulation of each cable.

The joint of the invention preferably comprises the enclosure of the invention.

The inner conductive layer preferably overlaps the cable insulation on each side of the joined conductors by at least about 20 mm.

The joint may also comprise one or more tubular layers of insulating material enclosing the inner conductive layer and extending axially over the insulation of the cables, the or at least one of the insulation layers preferably also extending over each of the cable screens. Where two or more insulating layers are provided, then one or more further conductive layers and/or an outer stress controlling layer may be interposed therebetween. Where only one further conductive layer is provided, this should be arranged to extend across the connector and to overlap on to the insulation of each cable beyond the end of the inner conductive layer by a length about twice the thickness of the underlying cable insulation. Two of said further conductive layers may be provided, axially symmetrically disposed about the connector so as to be axially spaced apart from the inner conducting layer and from each cable screen. Four of said further conductive layers may be provided, two each to each side of the inner conductive layer, each being axially spaced from the inner conductive layer and from the cable screens. The further conductive layers may be disposed in the inner surface or on the outer surface of the outer stress control layer when that is provided. The outer stress control layer may be of the same length as, or shorter or longer than the inner stress control layer, and may be electrically connected to the first stress control layer, and thus to the earthed cable screens at each end, or may be insulated therefrom so that it electrically floats at the electric potential existing at that lateral location in the joint.

The electrical continuity of the cable screens may be extended across the joint by an outermost conductive layer that encloses all of the above-mentioned layers and that is electrically connected to each cable screen. The joint may be provided with an outer metal braid, that enhances the current-carrying capacity of the outermost conductive screen layer of the joint, the braid making electrical connection with the cable screens and the earth wires of the two cables.

Finally, after connecting together the earth wires of the two cables, the joint may be enclosed within an outer insulating protective sleeve, for example of recoverable material, that is sealed at each end on to the cable jackets, thereby to avoid ingress of moisture, for example.

Preferably, the connector for the cable conductors extends laterally, usually radially, thereof substantially to the same extent as the adjacent cable insulation. Advantageously, the connector also substantially fills the space axially between the cut back ends of the insulation of the cables. Accordingly, there is substantially no change in lateral, usually radial, dimension along the joint from the insulation of one cable, over the connector, and on to the insulation of the other cable.

In accordance with a still further aspect of the present invention, there is provided a method of forming a joint between two high voltage cables, wherein the outer jacket of each cable is removed to expose the underlying cable screen, the cable screen is removed to expose the underlying cable insulation, and the insulation is removed to expose the underlying cable conductor, wherein a connector is applied to connect the conductors of the cables together, wherein a layer of electrical stress control material is disposed around the cables so as to enclose the connector, the insulation of each cable, and to overlap and contact the screen of each cable, and wherein a layer of conductive material is disposed around the stress control material so as to enclose the connector and to extend partway only along the insulation of each of the cables.

Additional layers of insulating, conductive and stress control material may be applied to form a joint as described above. In particular, it will be appreciated that two or more layers of insulating material may be required to provide the necessary thickness of insulation for the joint, in dependence on its voltage rating. Furthermore, the enclosure, joint and method of the invention may include additional layers other than those specifically mentioned, and such additional layers may be interposed between those specifically mentioned, where appropriate.

Although the enclosure, and layers of the invention are referred to as "tubular", this is not to imply that any one of them is necessarily inherently of tubular configuration. The layers may be applied in any suitable manner, and may adopt a tubular configuration in accordance with an underlying or overlying layer. For example, a tubular layer may be formed by tape winding, or by wrapping a sheet into a tubular configuration and securing its longitudinal edges together. In general, however, the layers are preferably inherently of closed tubular configuration and thus have to be mounted over one of the cables before the conductors are connected, being brought subsequently into position over the connection area when required during the assembly of the joint. The conductive layer(s) especially, however, may be provided by deposition, of paint for example, and where appropriate these layers and/or the stress control layers may be provided as a coating on the inside or outside of another of the layers of the joint or enclosure.

A flowable coating may be particularly advantageous where a tube, of greater wall thickness, may result in a step in a radial dimension, which could give rise to undesirable voids. Where a layer, and especially a coating, is said after assembly to be on an outer surface of a layer, this is understood to include the layer being applied on the inner surface of an enclosing layer.

Where one layer is said to enclose or to overlap another layer, this does not necessarily mean that the two layers are in electrical or physical contact with each other, but that one is laterally, usually radially, within the other. They may or may not be axially co-terminous.

Where it is important electrically that a layer axially overlap another layer, to achieve good stress control for example, the overlap should be sufficient to take into account any pull-back of the cable components from the cable conductor arising from thermal stresses during operation, and also to take into account any minor inaccuracies in the cut-backs effected by the jointer. To this end, such overlaps should generally be of about 20 mm length. For example, the cable dielectric is prone to pull back where the conductor is exposed. The above-mentioned overlaps between the conductive layer and the original location of the cable dielectric (tightly against the conductor connector) will ensure that the region around the connector and the exposed conductors always remains inside the Faraday Cage. For the same reasons, where an axial spacing is required, a sufficient gap should be left. For example, the inner conductive screen layer should extend for at least 20 mm over the insulation of each cable, and the inner stress control layer should extend over each cable screen by at least 20 mm.

In accordance with a further aspect of the present invention, there is provided a terminated screened high voltage cable, wherein the outer jacket of the cable is removed to expose the underlying cable screen, the screen is removed to expose the underlying cable insulation, and the insulation is removed to expose the cable conductor; an inner tubular layer of stress control material extends along at least part of the cable insulation and over the cable screen; an inner tubular layer of insulating material extends over the stress control layer at least to overlap the end of the cable screen, and preferably is substantially co-terminous with the stress control layer; a tubular layer of conductive material extends over the inner insulating layer so as to overlap the exposed cable insulation and to be axially spaced apart from the end of the cable screen, preferably by at least 10 mm, for example by at least 20 mm and advantageously by between about 20 mm and about 30 mm.

A connecting lug may be mounted on the exposed cable conductor, and the inner insulating layer may extend up to, and may extend on to, the lug.

Preferably, an outer protective insulating tubular layer overlaps, and advantageously longitudinally fully encloses, the inner stress control layer, inner insulating layer, the conductive layer and the exposed cable screen, and extends on to the cable jacket.

Preferably, and particularly at higher voltages, that is to say greater than about 69 kV, an outer tubular stress control layer is provided so as to be positioned radially directly inside, or outside, the conductive layer, and may or may not be electrically connected to the screen of the cable.

It will be understood that features of the enclosure and construction of a cable joint of the invention disclosed herein may be included in the terminated cable of the invention where applicable.

The inner stress control material may have a nonlinear a.c. electrical impedance characteristic, and thus satisfy the following equation:

$$I = kV^\gamma$$

Where
I is the current
V is the applied a.c. voltage
k is a constant, and
$\gamma$ is a constant $> 1$.

It will be appreciated that the stress controlling characteristics of the material will depend on the voltage rating of the cable with which it is to be used. In some applications, the stress control material may be linear, that is to say it may be such that $\gamma = 1$. A linear material is considered herein to be stress controlling if its specific impedance lies within the range from about $10^6$ ohm-cm to about $10^{10}$ ohm-cm, preferably from about $5 \times 10^7$ ohm-cm to about $5 \times 10^9$ ohm-cm, and most preferably from about $10^8$ ohm-cm to $10^9$ ohm-cm.

Advantageously, the outer stress control material, when present, is the same as the inner material. However, since the outer material is subject to a lower electrical stress, it may have less stringent characteristics, for example it may be linear when the inner material is non-linear, or less non-linear than the material of the inner layer. Such layers may be provided by SCTM heat shrinkable tubing available from Raychem.

The insulation materials used preferably have good tracking and erosion resistance, and preferably have a volume resistivity of at least $1 \times 10^{10}$ ohm cm, advantageously being of the order of $1 \times 10^{14}$ ohm cm. The inner layers may be provided by HVTM heat shrinkable tubing from Raychem, and the outermost by WCSM heat shrinkable tubing from Raychem.

The resistivity of the conductive layers should be less than about $5 \times 10^4$ ohm cm, being of the order of $10^{-6}$ ohm cm where metallic coatings are used to provide conductive layers.

Embodiments of enclosures, joints, a termination, and their methods of assembly, each in accordance with the present invention, will now be described, by way of example, with reference to the accompanying drawings, in which.

Figure 1:
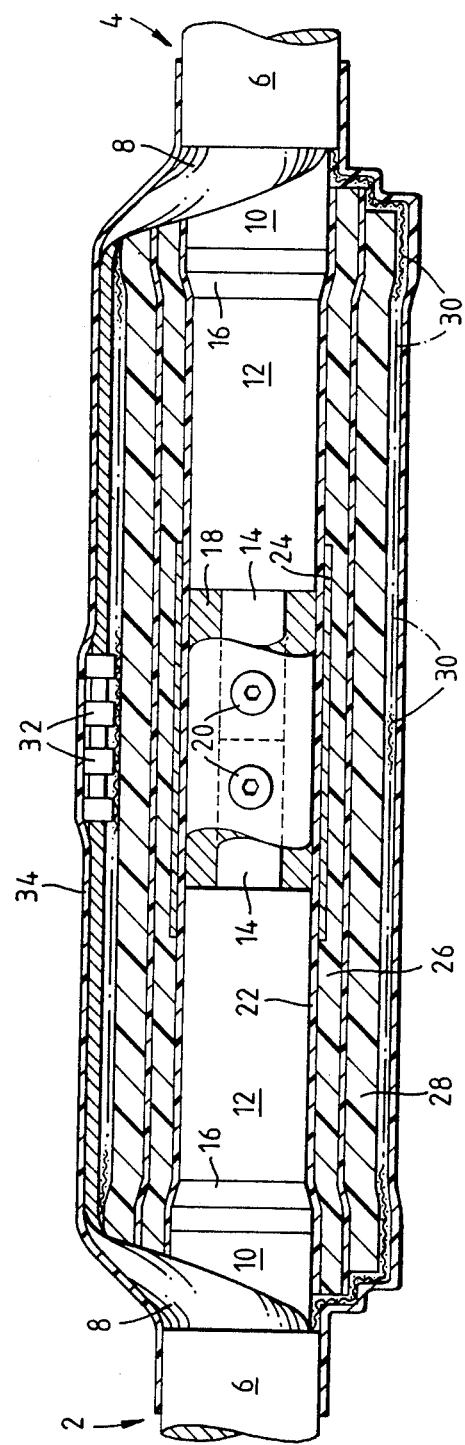
FIG. 1 shows a section through a 69 kV joint between two single core screened cross-linked polyethylene jacketed cables.

Referring to FIG. 1, two substantially identical cables 2,4 are prepared in conventional manner for jointing by having their outer jackets 6 cut back to expose the earth wires 8. The earth wires are bent back to expose the underlying semi-conductive screens 10, which are cut back to expose the underlying layers of cable insulation 12. The insulation 12 is cut back to expose the cable conductors 14. The step at the region of the exposed end of the cable screens 10 is smoothed over with conductive paint 16.

A cylindrical aluminum connector 18 is push-fitted on to one of the circular-sectioned conductors 14, and the other conductor 14 is push-fitted into the other side of the connector 18. Two each of screws 20 (only two of which are shown) are screwed into each conductor 14 from radially opposite sides thereof to effect interconnection of the cables. The connector 18 is manufactured to have a size related to the size and cut back dimensions of the cable such that the outer diameter of the connector 18 is substantially the same as that of the cable insulation 12, and such that its length is substantially the same as the sum of the exposed lengths of the cable conductors 14. Thus, there is a substantially uninterrupted cylindrical surface from the insulation 12 of the cable 2, across the connector 18, and on to the insulation 12 of the cable 4.

A tube 22 of heat shrinkable polymeric material having electrical stress control characteristics is recovered over the cables so as to enclose the connector 18 and the insulation 12 and conductive paint 16 of each cable 2,4, and to overlap by about 20 mm into contact with each cable screen 10. A layer 24 of conductive paint is applied on to the outside of the expanded stress control tube 22 along a central portion only, so as to extend over the connector 18 and over an adjacent portion of about 20 mm length of the insulation 12 of each cable 2,4, and so as to remain in position as the tube 22 is recovered. A co-extruded tube 26 of two layers of insulating material is recovered over the stress control tube 22 so as to be substantially coterminous therewith. The tube 26 has an inner layer of elastomeric material and an outer layer of heat-shrinkable thermoplastic material acting as a hold-out. Additional insulation and an outer screen is applied to the joint in the form of a recoverable co-extruded tube 28. The tube 28 has two layers, comprising an inner insulating elastomeric layer and an outer conductive heat shrinkable layer. To enhance the current-carrying capacity of the outer screen layer of the tube 28, a metal braid 30 is wound along the joint around the above-mentioned layers, and is electrically connected to the earth wires 8 of each cable 2,4. The earth wires 8 of each cable 2,4 are formed into a pigtail, brought together over the joint and connected by a crimp connector 32. Finally, the joint is enclosed within an outermost heat shrinkable tube 34 of insulating material that is recovered so as to enclose all the above-mentioned layers, and to seal on to the outer jacket 6 of each of the cables 2,4.

Figure 2:
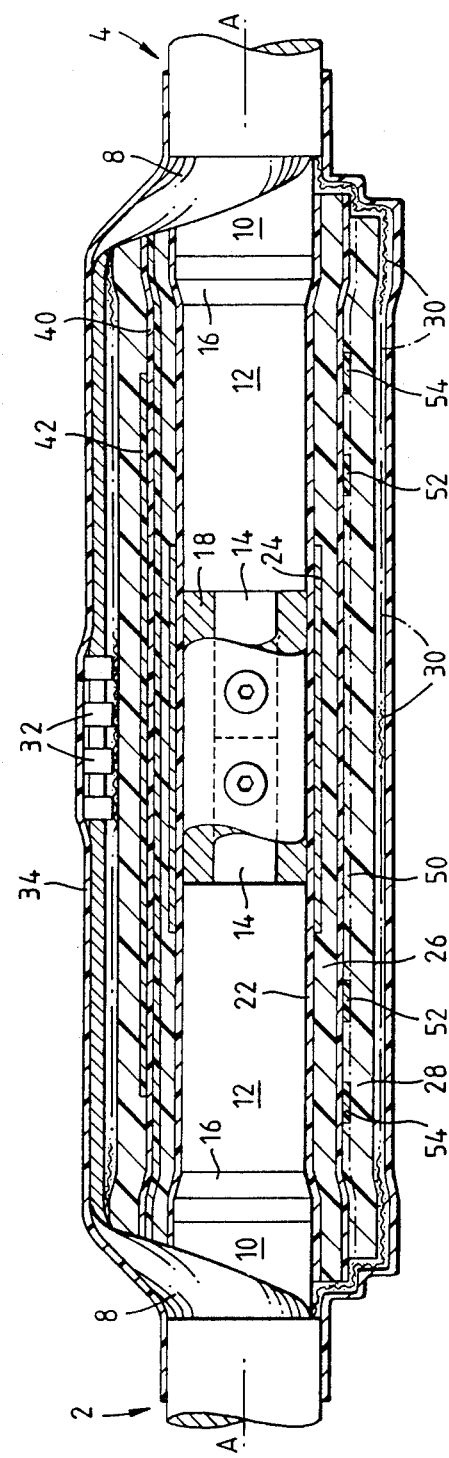
FIGS. 2A and 2B show two embodiments of a 115 kV joint between two single core screened cross-linked polyethylene jacketed cables.
Figure 2A:
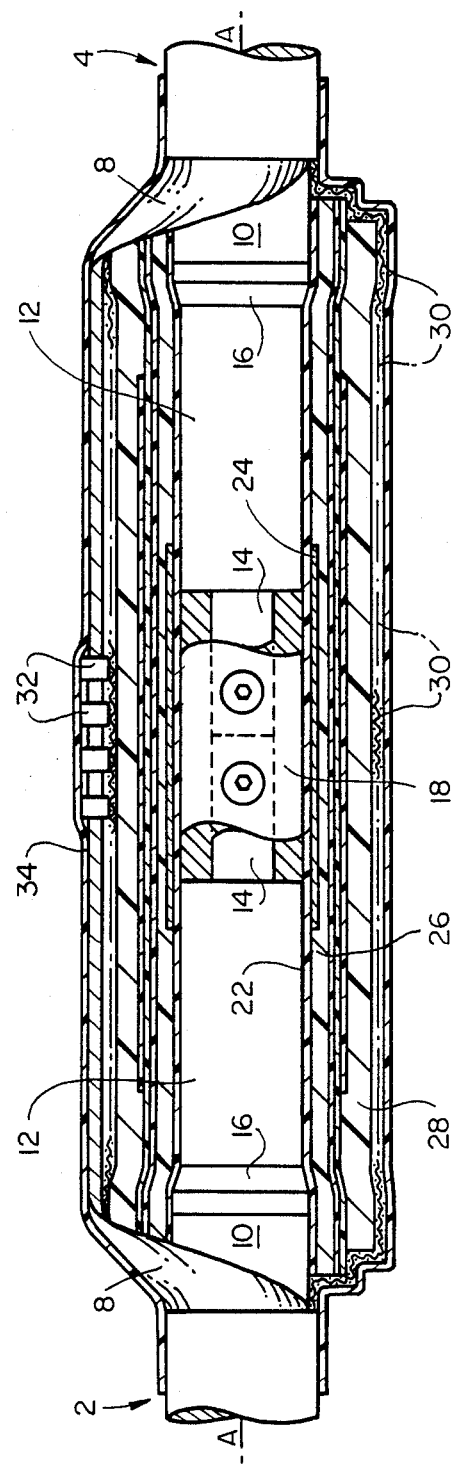
Figure 2B:
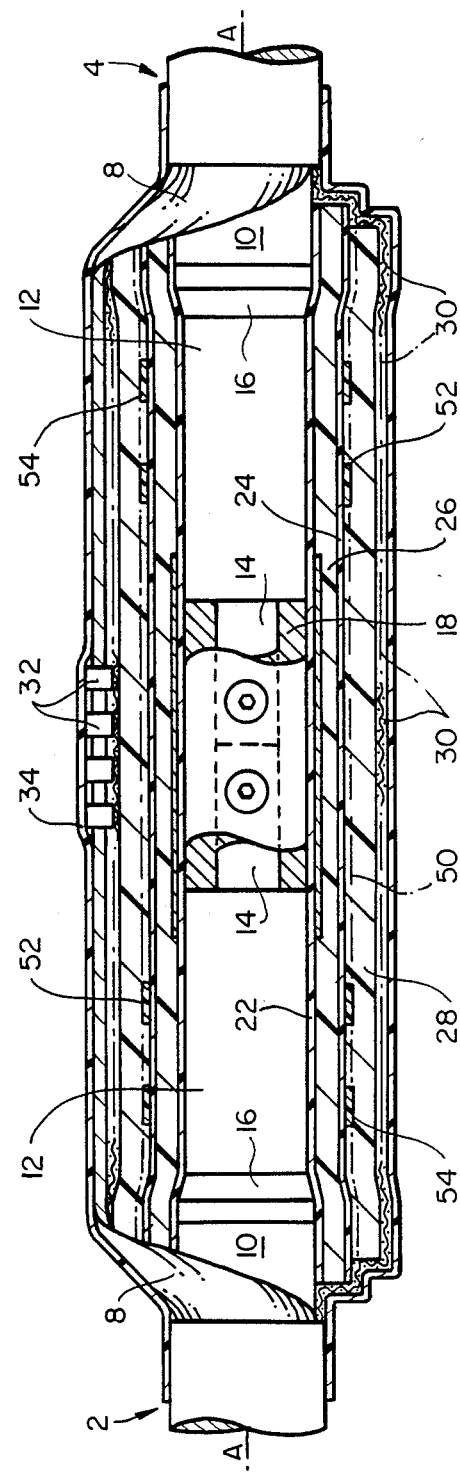

The higher voltage, 115 kV, joints of FIGS. 2A and 2B have constructions similar to that of the 69 kV joint of FIG. 1, and to that extent the same reference numerals are used. The joints of FIGS. 2A and 2B, however, have additional stress control means to deal with the higher electrical stress associated with the higher voltage. It will be understood, that the insulation layers of the higher voltage joints may be thicker and/or greater in number to deal with the higher electrical stress. It will also be understood that in practice, apart from the crimping at 32 of the earth wires 8, the joints will have rotational symmetry about their longitudinal axes A-A.

Referring to FIG. 2A, in addition to the tubes 22,26,28 and 34, and the inner conductive screen 24, the joint is provided with an outer tube 40 of heat shrinkable polymeric material having electrical stress control characteristics that extends across the connector 18, and the insulation 12 and conductive paint 16 of each cable 2,4, and to overlap each cable screen 10. The outer stress control tube 40 is co-terminous with the inner stress control tube 22, and is contacted at its ends by the earth braid 30, and is thus electrically connected to the cable screens 10. However, the tube 40 may be shorter, or longer, than the tube 22, and may not be connected to the earthed screens 10, thus allowing it electrically to float at the voltage existing at that radial position of the joint.

Still referring to FIG. 2A, the joint is shown provided with a further conductive screen layer 42 that extends along a central part only of the outer surface of the stress control tube 40. The layer 42 encloses the connector 18, and extends axially beyond each end of the inner conductive screen 24 by an amount equal to about twice the thickness of the insulation 12 of the cables 2,4, and is axially spaced from each cable screen 10. As an alternative, the screen layer 42 may be provided inside the outer stress control layer 40 so as to lie between that layer and the outer insulating layer of the tube 26. In a still further embodiment, the stress control layer 40 may be omitted, and only the outer screen layer 42 employed between the two insulating layers.

Referring now to FIG. 2B, an optional outer stress control tube 50 comparable with the tube 40 is shown. Also shown are two pairs 52, 54 of conductive screen layers, one layer of each pair being disposed symmetrically on each side of the connector 18. The layers 52,54, only one or the other pairs of which may be provided, may be provided on the inner or on the outer surface of the stress control tube 50, when present. Otherwise, the or each pair of layers may be provided between the outer layer of the tube 26 and the inner layer of the tube 28. The layers 52 and 54 are axially spaced apart from the end of the inner screen layer 24 and from the cable screens 10.

It will be appreciated that the conductive layers 42,52 and 54 act to form capacitive elements within the joint, thereby reducing the electrical stress.

Figure 3:
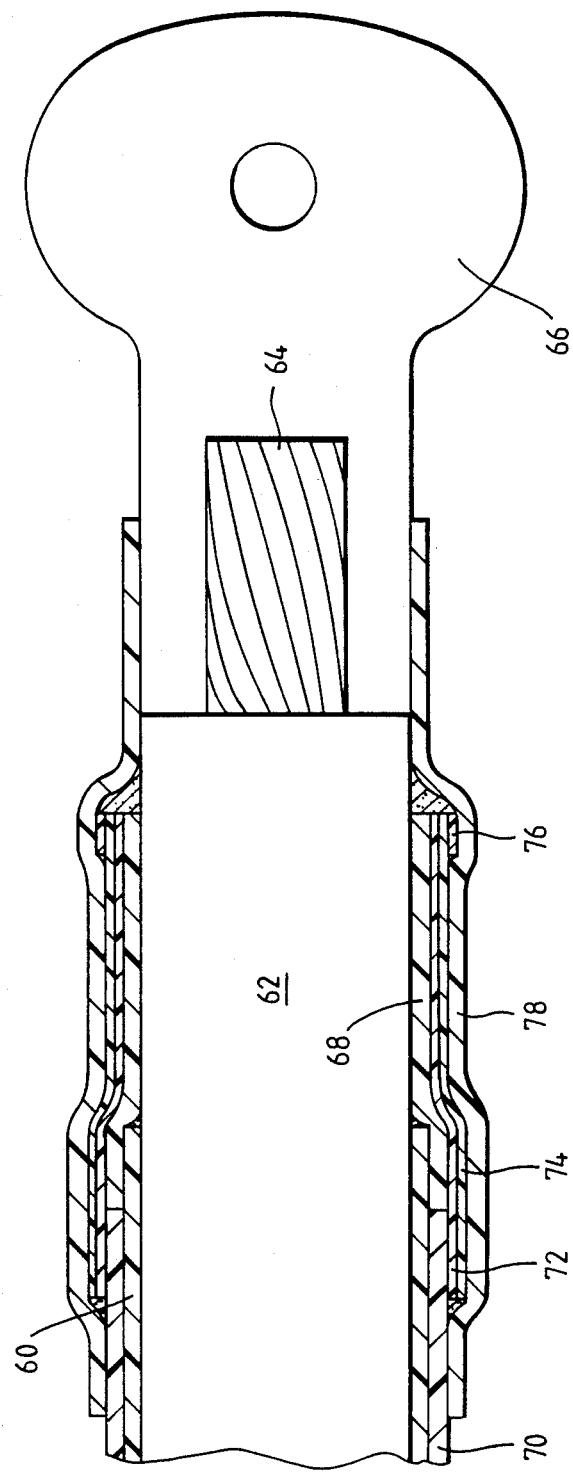
FIG. 3 shows a section through a terminated 69 kV screened cable.

Referring to FIG. 3, a 69 kV screened cable is cut back so as successively to expose the cable screen 60, insulation 62 and conductor 64. A connecting lug 66 is crimped on to the conductor 64. A heat recoverable stress control tubular sleeve 68 is recovered on to the cable so as to extend partway along the cable insulation 62, and thence over the screen 60 up to the cut back end of the outer insulating jacket 70 of the cable. A heat recoverable insulating sleeve 72 is recovered on top of the stress control sleeve 68 so as to be coterminous therewith, and a further stress control sleeve 74 is recovered on top of the insulating sleeve 72. A conductive layer 76 of paint is disposed on the outside of the outer stress control sleeve 74 at the end thereof disposed towards the lug 66, and is axially spaced apart from the cut back end of the cable screen 60 by about 25 mm. Finally, an outer insulating protective sleeve 78 is recovered on to the above-mentioned components so as to extend from the cable jacket 70 continuously on to the connector lug 66. Typically, the conductive layer would extend axially for about 5 cms, and the separation between the exposed conductor and the screen cut-back would be about 1 meter.

The capacitive effect produced by the presence of the electrically floating conductive layer 76 significantly reduces the electrical stress between on the one hand the conductor 64 and lug 66 at high voltage and on the other hand the cable screen 60 at earth potential.

I claim:

1. A joint between two high voltage cables each of the type having a cable conductor, insulation around the cable conductor, a screen surrounding the insulation, and an outer jacket overlying the screen, wherein: the outer jacket of each cable is removed to expose the underlying cable screen, the screen is removed to expose the underlying cable insulation, and the insulation is removed to expose the cable conductor; the conductors of each cable are joined together; an inner tubular layer of electrical stress controlling material extends over the joined conductors, along the insulation of each cable and overlaps and contacts each of the cable screens; and wherein an inner tubular layer of electrically conductive material extends along the outer surface of the inner stress control layer so as to enclose the connection between the conductors and to extend partway only along the insulation of each cable.

2. A cable joint according to claim 1, comprising an inner tubular layer of insulating material that encompasses the inner conductive layer, the inner stress control layer, and the screen of each of the cables.

3. A cable joint according to claim 2, comprising a further inner tubular layer of insulating material and at least one tubular layer of conductive material disposed intermediate said inner and said further inner insulating layers, said at least one intermediate conductive layer being axially spaced from the screen of each of the cables.

4. A cable joint according to claim 3, wherein said at least one intermediate conductive layer extends as a single layer to enclose the conductor connection and to extend beyond each end of the inner conductive layer.

5. A cable joint according to claim 3, comprising two of said intermediate conductive layers axially spaced apart from each other and from the conductor connector, on each side of said connector.

6. A cable joint according to claim 1, comprising a further inner tubular layer of insulating material and an outer tubular layer of electrical stress controlling material disposed between said inner insulating layer and said further inner insulating layer.

7. A cable joint according to claim 1, comprising an outer tubular conductive layer that extends across the joint and provides electrical interconnection between the screen of each of the cables, and an outermost tubular layer of insulating material that encloses the outer conductive layer and overlaps in contact with the outer jacket of each of the cables.

8. A cable joint according to claim 1, wherein at least one of the tubular layers is recoverable.

9. A cable joint according to claim 1, comprising a connector that connects together the conductors of each cable, and that extends laterally of the conductors to the same extent as the insulation of the cables.

10. A terminated screened high voltage cable of the type having a cable conductor, insulation around the cable conductor, a screen surrounding the insulation, and an outer jacket overlying the screen wherein the outer jacket of the cable is removed to expose the underlying cable screen, the screen is removed to expose the underlying cable insulation, and the insulation is removed to expose the cable conductor; an inner tubular layer of stress control material extends along at least part of the cable insulation and over the cable screen; an inner tubular layer of insulating material extends over the stress control layer at least to overlap the end of the cable screen, and a tubular layer of conductive material extends over the inner insulating layer so as to overlap the exposed cable insulation and to be axially spaced apart from the end of the cable screen.

11. A method of forming a joint between two high voltage cables each of the type having a cable conductor, insulation around the cable conductor, a screen surrounding the insulation, and an outer jacket overlying the screen, comprising the steps of removing the outer jacket of each cable to expose the underlying cable screen, removing the cable screen to expose the underlying cable insulation, removing the insulation to expose the underlying cable conductor, applying a connector to connect the conductors of the cables together, disposing a layer of electrical stress control material around the cables so as to enclose the connector, the insulation of each cable, and to overlap and contact the screen of each cable, and disposing a layer of conductive material around the stress control material so as to enclose the connector and to extend partway only along the insulation of each of the cables.

12. A method according to claim 11, including the further step of disposing a layer of insulation material around the stress control layer and the conductive layer so as to enclose the connector, the insulation of each cable, and to overlap the screen of each cable.

13. A method according to claim 11, including the further steps of disposing a layer of insulation material around the stress control layer and the conductive layer, and arranging at least one further layer of conductive material so as to enclose said insulating layer and part only of the insulation of each cable so as to be axially spaced apart from the screen of each cable.

14. A method according to claim 11, including the further steps of disposing a layer of insulation material around the stress control layer and the conductive layer, and disposing a further layer of stress control material around said layer of insulating material.

15. A method according to claim 11, including the further step of applying at least one of the layers to the cables as a tubular layer.

16. A method according to claim 11, including the further steps of forming at least one of the layers as a recoverable layer and recovering it around the cables.

* * * * *